US006837758B2

(12) United States Patent
Drefs et al.

(10) Patent No.: US 6,837,758 B2
(45) Date of Patent: Jan. 4, 2005

(54) FAST MILITARY SURFACE CRAFT

(75) Inventors: Armin Drefs, Itzehoe (DE); Rainer Hartig, Hamburg (DE); Stefan Richter, Delmenhorst (DE); Wolfgang Rzadki, Glinde (DE); Karl-Otto Sadler, Hamburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/466,809

(22) PCT Filed: Jan. 9, 2002

(86) PCT No.: PCT/DE02/00039

§ 371 (c)(1),
(2), (4) Date: Nov. 3, 2003

(87) PCT Pub. No.: WO02/057132

PCT Pub. Date: Jul. 25, 2002

(65) Prior Publication Data

US 2004/0063363 A1 Apr. 1, 2004

(30) Foreign Application Priority Data

Jan. 22, 2001 (DE) .......................................... 101 02 741
Aug. 28, 2001 (DE) .......................................... 101 41 893

(51) Int. Cl.$^7$ .............................................. B60L 11/02
(52) U.S. Cl. .......................................... 440/6; 114/151
(58) Field of Search ........................ 440/6, 38; 114/151

(56) References Cited

U.S. PATENT DOCUMENTS

| 4,081,693 | A | | 3/1978 | Stone | |
|---|---|---|---|---|---|
| 4,406,630 | A | * | 9/1983 | Wood, Jr. | 440/6 |
| 5,417,597 | A | | 5/1995 | Levedahl | |
| 5,605,480 | A | * | 2/1997 | Wright | 440/43 |
| 5,832,856 | A | * | 11/1998 | Giles | 114/61.26 |
| 6,062,921 | A | | 5/2000 | Mock et al. | |
| 6,203,388 | B1 | * | 3/2001 | Sinko et al. | 440/6 |
| 6,325,010 | B1 | * | 12/2001 | Gruenwald | 114/151 |
| 2002/0023579 | A1 | * | 2/2002 | Profitt et al. | 114/61.12 |

FOREIGN PATENT DOCUMENTS

| DE | 42 06 720 | 9/1992 |
|---|---|---|
| GB | 287510 | 10/1928 |
| GB | 1 273 600 | 12/1969 |
| JP | 9142384 | 6/1997 |
| WO | WO 00/68072 | 11/2000 |

OTHER PUBLICATIONS (XP–002201737) Hammerschmidt, Albert and Gunter Sattler. "Die Brennstoffzelle und Wasserstofferzeugung mittels Reformer (Fuel Cells and Hydrogen Generation with Reformer", Bd. 92, 1998, pp. 275–281, Berlin, Germany.
(XP–002109514) Goossens, L. "A New Design Lay–Out with Alternative Propulsion on High Speed Displacement Ships", International Marine Design Conference and Summer Meeting of the German Soc . . . vol. 1, Nr. 1, pp. 111–124; S. 117.

* cited by examiner

*Primary Examiner*—Stephen Avila
(74) *Attorney, Agent, or Firm*—Harness, Dickey & Pierce, P.L.C.

(57) ABSTRACT

A fast military surface craft, particularly a frigate or a corvette, includes at least two electric rudder propeller drives, whereby the electric ruder propeller drive is placed at a cruising speed. The electric energy for the rudder propeller of the electric rudder propeller drives is generated by way of fuel cell units distributed in a de-centralized manner in the ship. At least two, preferably electric, hydrojets are provided with underwater hydrojet exit nozzles to enable the craft to travel at high speeds, whereby the electric energy of the hydrojets is produced, by generators.

33 Claims, 2 Drawing Sheets

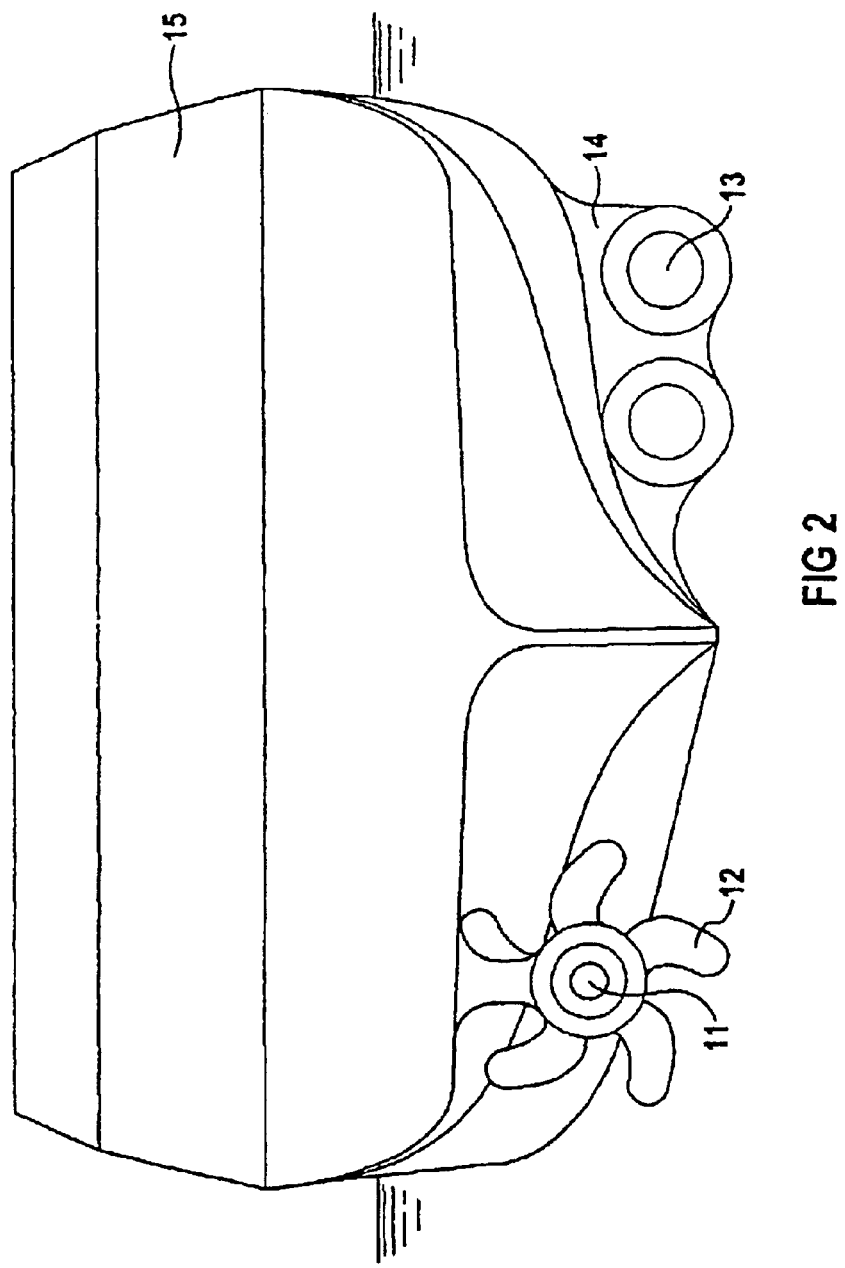

FAST MILITARY SURFACE CRAFT

This application is the national phase under 35 U.S.C. § 371 of PCT International Application No. PCT/DE02/00039 which has an International filing date of Jan. 9, 2002, which designated the United States of America and which claims priority on German Patent Application No. DE 101 02 741.9 filed Jan. 22, 2001 and DE 101 41 893.0 filed Aug. 2001 the entire contents of which are hereby incorporated herein by reference.

FIELD OF THE INVENTION

The invention generally relates to a high-speed naval (military, etc.) surface craft or vessel, in particular to a frigate or corvette, having at least two electrical steering propeller propulsion systems which can swivel.

BACKGROUND OF THE INVENTION

U.S. Pat. No. 5,417,597 discloses a high-speed naval surface vessel which includes two steering propeller propulsion systems. The electrical power for the propulsion systems is produced by power producing modules in the vessel, which each contain a gas turbine, a generator and an inverter. This known vessel has the disadvantage that it cannot move without producing emissions. A further disadvantage is that the electrical steering propeller propulsion systems must be designed for battle speed, that is to say they operate uneconomically at cruise speed. A further disadvantage is that a hit, for example a torpedo striking the stern, will result in the vessel not being able to maneuver and will result in the vessel remaining stationary. The maximum speed is also restricted, since the steering propellers which are needed in order to reach a very high speed are so large and so heavy that they cannot be accommodated in the stern of a slender naval surface vessel.

SUMMARY OF THE INVENTION

An object of an embodiment of the invention is to specify a high-speed naval surface vessel which does not have at least one of the disadvantages mentioned above. In particular, its survival capability is intended to be considerably better than that of the known vessel. It is also intended to be capable of operation without any emissions up to cruise speed.

An object may be achieved in that the electrical steering propeller propulsion systems are designed for cruise speed, with the electrical power for the steering propellers for the electrical steering propeller propulsion systems being produced by fuel cell units which are distributed in a decentralized manner in the vessel, and with at least two, preferably electrical, water jet propulsion systems with water jet outlet nozzles under the water being provided for higher speeds, whose electrical power is preferably produced by generators. Integration of water jet propulsion systems in the vessel advantageously makes it possible to achieve a high battle speed with relatively small electrical steering propeller propulsion systems which may be operated without any emissions. A further advantage is that the water jet propulsion systems can be arranged at a considerable distance from the electrical steering propellers, so that a single hit, even a severe hit, cannot render the entire propulsion system of the vessel inoperative. A further advantage in this case is that water jet propulsion systems allow high speeds to be achieved, without the weight and the space requirement for such propulsion systems becoming excessively great. Overall, the solution according to an embodiment of the invention results in an improvement in combat effectiveness, with better survivability at the same time.

A refinement of an embodiment of the invention provides that the steering propellers are arranged under the stern and the water jet propulsion systems are arranged under the area of the vessel closely behind the center of the vessel, for example being placed in the area between 60% and 75% of the length of the vessel. This advantageously makes it possible for the water jet propulsion systems to allow the vessel to be controlled in the event of failure of the electrical steering propellers. This is particularly true if the water jet directions differ horizontally from the longitudinal axis of the vessel. A further improvement in maneuverability is achieved with the aid of the water jet propulsion systems if jet direction adjusting apparatuses are provided. This even allows fine control and, in conjunction with the water jets which emerge at an angle to the longitudinal axis of the vessel and can be said to produce thrusts of different intensity as in the case of a twin-screw vessel, this results in the maneuverability still being sufficient overall even in the event of failure of the electrical steering propellers.

A further refinement of the invention provides that the water jet propulsion systems each have associated electric motors, which are replaced supplied with electrical power from gas turbine generator sets. This allows the water jet propulsion systems to continue to operate independently of the vessel electrical power supply system and, advantageously, they can still be operated even in the event of a complete failure of the vessel electrical power supply system. In order to improve the operational reliability even further, provision is in this case made for the vessel to have two double water jet units, each having two electric motors, two turbine pump units and two outlet nozzles. This results in redundant propulsion units, which are particularly reliable, and also have a high probability of maintaining at least a minimum level of operation in the event of a hit.

A further refinement of the invention provides that the gas turbine exhaust gas pipes have a large diameter and little pipe curvature, and open into exhaust gas/water mixing chambers behind the water jet pumps for the water jet propulsion systems. This arrangement results in there being little resistance to the exhaust gas emerging from the gas turbines, so that this results in only a minor drop in efficiency compared to the manner in which the exhaust gas jet emerges freely from the standard aircraft gas turbines that are advantageously used, for example GE gas turbines.

Provision is in this case made for the mixing chambers to be designed such that there is a reduced pressure in them. This highly advantageously results in the exhaust gases being introduced into the water outlet jet where the temperature of the exhaust gases is quickly matched to the water temperature. This avoids detection by IR detectors in satellites or in missiles, even when using the water jet propulsion systems. The mixing chambers are advantageously designed such that exhaust gas bubbles are produced, which are carried away with the water jet. The formation of exhaust gas bubbles results in particularly fine distribution of the exhaust gases in the water. The hot gas turbine exhaust gases are thus cooled down particularly quickly and uniformly. There are no heat trails in the water, which would betray the vessel to an approaching missile or a satellite.

A further refinement of the invention provides that the direction of the water jets differs vertically from the longitudinal direction of the vessel and, in particular, runs at an angle under the steering propellers. This highly advantageously results in the steering propellers being kept away from the water jets from the water jet propulsion systems, which flow toward the stem at a relatively high speed. The steering propeller propulsion systems can thus operate highly efficiently with good controllability, even during operation of the water jet propulsion systems. Furthermore, cavitation problems are avoided, and the rotation speed of the steering propellers can be kept lower.

The water jet propulsion systems are advantageously arranged in housings which project from the bottom of the vessel. A single water inlet can therefore be provided for the water jet pumps, and the water jet propulsion systems can easily be optimized for good flow conditions on the outlet side. Furthermore, installation, removal and servicing of the water jet devices in the dock is simpler.

A further refinement of the invention provides that the circle of rotation of the steering propellers is within the hull cross section, with the housings of the water jet propulsion systems determining the largest hull cross section. The propellers of the steering propellers are thus protected by the cross section of the hull against deformation in the possible event of the vessel running aground. At the same time, they are arranged as deep as is physically possible, without losing the protection function of the largest cross section of the hull.

Provision is also made within the scope of an embodiment of the invention for the steering propellers to be as close to one another as possible, for example with the distance between them corresponding to 1.2 times the propeller diameter. Further, provision is preferably made for an auxiliary rudder blade to be arranged in front of or behind the steering propellers, and being intended to be used, in particular, when moving straight ahead. This highly advantageously results in a steering arrangement for moving straight ahead, which allows the vessel to travel well in a straight line, and the steering propellers can remain fixed when moving straight ahead. This results in the capability to apply steering controls with particularly little noise, and the power consumption is reduced. At the same time, the short distance between the electrical steering propellers allows for the entire stern structure to be designed to be light.

A further refinement of the invention provides for the electrical steering propellers to each have one traction propeller. This results in advantageous high efficiency of the propellers. The electrical steering propellers may also have propellers which rotate in the same direction at each end of the electric motor, which results in the advantage that smaller propellers can be used. This is advantageous when the draft of the vessel is intended to be kept low, with the intention being that the draft of the vessel should not be more than 8 m. This makes it possible to enter many harbors, especially in Europe, and also to move through coastal waters, which are not accessible to vessels with a greater draft.

In order to improve the survivability of the vessel, provision is made for all the propulsion motors and power production units to be at least duplicated, and for the rotating power production units and the electric motors for the steering propellers and for the water jet pumps to be mounted on shock absorbers.

In order to improve the survivability, provision is also made for the vessel to have a direct-current network with current limiters which can use physical processes to extinguish arcs as they occur, in particular, high-temperature super-conducting current limiters. This advantageously prevents the formation of arcs, with their highly negative consequences. The creation of an arc generally results in electrical failure of entire areas of the vessel. The main switchgear assembly generally has to be operated in order to quench relatively large arcs, and the entire vessel is then temporarily without any electrical power. The use of high-temperature super conducting current limiters makes it possible to prevent reliably the creation of arcs. This avoids the main switchgear assembly having to be operated in order to disconnect arcs. This overcomes a major reason for failure of the electrical system in naval vessels and, in the vessel according to the invention, ensures in particular that the electrical steering propellers, which are supplied via the vessel electrical power supply system, can remain in operation even after a hit in some other area of the vessel. For this purpose, the steering propellers advantageously have an emergency control station, for example in the stern.

In order to improve the efficiency of the steering propellers, when using the water jet propulsion systems, provision is made for the steering propellers to have variable-pitch propellers, whose rotation speed and pitch can be matched to the speed of the vessel. Provision is also made for the vessel to have a raised, possibly flat, underwater vessel profile in the last 25% to 30% of the length of the vessel. This results in a particularly good wake behavior in the stern area, which improves the speed of the vessel to a not inconsiderable extent, without increasing the propulsion power. These variable-pitch propellers and the specific configuration of the stern of the vessel result in an increase in speed which makes it particularly advantageous to use a steering propeller propulsion system which is fed from fuel cells, with power production that is less than that of gas turbine generator sets. In order to improve the course stability despite the raised stern section, provision is made for the vessel to have a center skeg in front of the steering propellers, which ends approximately one steering propeller length in front of the steering propellers. In conjunction with the auxiliary rudder, this measure avoids continuous movement of the electrical steering propellers in order to maintain the course. The drive requirement for the rotating motors for the electrical steering propellers is decreased in a corresponding manner and there is also betraying noise during operation of the steering propellers.

A further refinement of the invention provides for the electrical steering propellers to windmill during operation of the water jet propulsion units. This advantageously avoids the propellers of the steering propellers producing a braking effect when the vessel is being operated with only the water jet propulsion systems. If it is intended to increase the speed above the speed which can be achieved by the water jet propulsion systems, then the steering propeller propulsion system is connected to match the power demand, with the rotation speed and pitch of the propellers of the electrical steering propellers advantageously being matched to the operating mode. When the water jet propulsion systems and the steering propellers are used on full load at the same time, this then results in the maximum speed.

Provision is in this case made for the electrical steering propellers, which are preferably in the form of a three-phase propulsion system, to be operated in the speed variation by field control range when the rotation speed exceeds $n_1$. This ensures that the maximum possible power is emitted from the steering propellers, even at high speeds.

BRIEF DESCRIPTION OF THE DRAWINGS

The embodiments of the invention will be explained in more detail with reference to drawings, from which further details which are also significant to the invention can be seen.

In detail, in the form of outline illustrations:

FIG. 2 shows a view of the stern of the vessel according to an embodiment of the invention.

DETAILED DESCRIPTION OF THE PREFERRED EMBODIMENTS

Figure 1:
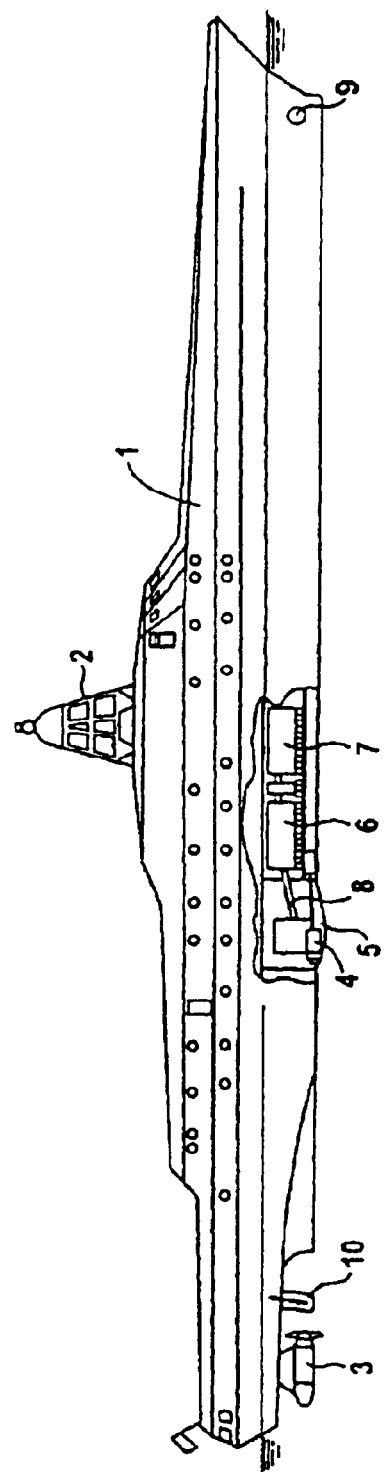
FIG. 1 shows a high-speed naval surface vessel according to an embodiment of the invention, partially sectioned.

In FIG. 1, 1 denotes the hull of the vessel and 2 denotes a possibly retractable radar tower. Further sensors, etc. which are required for the safety and control of the vessel, are also fitted in this tower. The steering propeller device 3 is arranged under the stern of the vessel, and an auxiliary rudder, which is preferably retractable, is located in front of it. This auxiliary rudder is used in particular for control at cruise speed. In a battle situation, it may be retracted, and is thus particularly protected.

The water jet outlet nozzles 4, with the gas feed mixing arrangement arranged above them, as well as a gas turbine 6 and a generator 7 are located in a separate housing 5 in the central part of the vessel. The exhaust gas pipe 8, which is designed to have as little curvature as possible, is located between the gas turbine 6 and the water jet device 4.

A lateral thruster 9 is also located in the bow of the vessel and can also be replaced by a retractable small electrical steering propeller, which then results in improved maneuverability of the vessel—for example, there is no need whatsoever for any assistance from tugs in harbor areas, as a result of the interaction of the steering propeller units 3 which are arranged in the stern and the lateral thruster or small steering propeller in the bow. The small steering propeller in the bow area may in this case also be in the form of an autonomously operating "take home" propulsion system.

In FIG. 2, 11 denotes the electrical steering propellers and 12 the propellers of the electrical steering propellers. Both the electrical steering propeller housings and the propellers of the electrical steering propellers are advantageously made of bronze and are designed such that the propellers 12 do not extend any deeper than the housing 14 of the water jet propulsion systems 13. For simplicity, only in each case one electrical steering propeller and one water jet propulsion system is shown on each side of the hull 15.

In the same way as the electrical steering propellers 11, the water jet propulsion systems 13 may correspond to units as are known from civil maritime use. Electrical steering propellers are constructed, for example, by the Siemens-Schottel consortium (with the propulsion system having the trade name SSP), and corresponding water jet propulsion systems are constructed by Royce Rolls Navalmarine Inc. and the BJCO-120 type in particular can be used advantageously in this case. With reference to the noise that is produced, the magnetic and electrical signatures and the shock absorption, the civil propulsion systems are matched to the requirements for naval vessels.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A high-speed naval surface vessel, comprising:
at least two electrical steering propeller propulsion systems adapted to be swiveled, wherein the electrical steering propeller propulsion systems are designed for cruise speed, and wherein electrical power for the steering propellers for the electrical steering propeller propulsion systems is produced by fuel cell units, distributed in a decentralized manner in the vessel; and
at least two water jet propulsion systems including water jet outlet nozzles under the water, provided for higher speeds, wherein electrical power for the at least two water jet propulsion systems is produced by generators, and wherein steering propellers are arranged under the stern of the vessel and the water jet propulsion systems are arranged under an area of the vessel closely behind the center of the vessel.

2. The high-speed naval surface vessel as claimed in claim 1, wherein the water jet propulsion systems include jet direction adjusting apparatuses.

3. The high-speed naval surface vessel as claimed in claim 1, wherein the water jet propulsion system each include associated electric motors, supplied with electrical power from gas turbine generator sets.

4. The high-speed naval surface vessel as claimed in claim 1, wherein the vessel includes two double water jet units, each having two electric motors, two turbine pump units and two outlet nozzles.

5. The high-speed naval surface vessel as claimed in claim 1, wherein the gas turbines include relatively large diameter exhaust gas pipes with little curvature, which open into at least one of exhaust gas and water mixing chambers behind the water jet pumps for the water jet propulsion systems.

6. The high-speed naval surface vessel as claimed in claim 5, wherein the mixing chambers are designed such that there is a reduced pressure in them.

7. The high-speed naval surface vessel as claimed in claim 5, wherein the mixing chambers are designed such that exhaust gas bubbles are produced, which are carried away with the water jet.

8. The high-speed naval surface vessel as claimed in claim 5, wherein the direction of the water jets differs vertically from the longitudinal direction of the vessel.

9. The high-speed naval surface vessel as claimed in claim 5, wherein the water jet propulsion systems are arranged in housings which project from the bottom of the vessel.

10. The high-speed naval surface vessel as claimed in claim 1, wherein the circle of rotation of the steering propellers is within the hull cross section, with the housings of the water jet propulsion systems determining the largest hull cross section.

11. The high-speed naval surface vessel as claimed in claim 1, wherein the steering propellers are as close to one another as possible and wherein a steering rudder blade is arranged at least one of in front of and behind the steering propellers, and is adapted to be used in particular when moving straight ahead.

12. The high-speed naval surface vessel as claimed in claim 1, wherein the electrical steering propellers each include a traction propeller.

13. The high-speed naval surface vessel as claimed in claim 1, wherein the electrical steering propellers include propellers which rotate in the same direction at each end of the electric motor.

14. The high-speed naval surface vessel as claimed in claim 1, wherein the draft of the vessel is not more than 8 m.

15. The high-speed naval surface vessel as claimed in claim 1, wherein the gas turbine generator units for the water jet propulsion systems are arranged at least one of approximately at the center of the vessel and immediately behind it.

16. The high-speed naval surface vessel as claimed in claim 1, wherein the rotating power production units and the electric motors for the steering propellers and for the water jet pumps are mounted on shock absorbers.

17. The high-speed naval surface vessel as claimed in claim 1, wherein all the propulsion motors and power production units are at least duplicated.

18. The high-speed naval surface vessel as claimed in claim 1, wherein the vessel includes a direct-current network with current limiters, adapted to use physical processes to extinguish arcs as they occur.

19. The high-speed naval surface vessel as claimed in claim 1, wherein the steering propellers include variable-pitch propellers, whose rotation speed and pitch are matchable to the speed of the vessel.

20. The high-speed naval surface vessel as claimed in claim 1, wherein the vessel includes a raised underwater vessel profile in the last 25% to 30% of the length of the vessel.

21. The high-speed naval surface vessel as claimed in claim 1, wherein the vessel includes a center skeg in front of the steering propellers, which ends approximately one steering propeller length in front of the steering propellers.

22. The high-speed naval surface vessel as claimed in claim 1, wherein the electrical steering propellers windmill during operation of the water jet propulsion units.

23. The high-speed naval surface vessel as claimed in claim 1, wherein, when the maximum speed is demanded, both the electrical steering propellers and the water jet propulsion systems run at maximum power, with the rotation speed and pitch of the propellers of the electrical steering propellers being matched to this operating mode.

24. The high-speed naval surface vessel as claimed in claim 1, wherein the electrical steering propellers are operated in the speed variation by field control range when the rotation speed exceeds $n_1$.

25. The high-speed naval surface vessel of claim 1, wherein the vessel is at least one of a frigate and a corvette.

26. The high-speed naval surface vessel of claim 1, wherein the at least two water jet propulsion systems are electrical.

27. The high-speed naval surface vessel of claim 1, wherein the water jet propulsion systems are arranged under an area of the vessel closely behind the center of the vessel, placed in the area between 60% and 75% of the length of the vessel.

28. The high-speed naval surface vessel as claimed in claim 2, wherein the water jet propulsion systems each include associated electric motors, supplied with electrical power from gas turbine generator sets.

29. The high-speed naval surface vessel as claimed in claim 6, wherein the mixing chambers are designed such that exhaust gas bubbles are produced, which are carried away with the water jet.

30. The high-speed naval surface vessel as claimed in claim 5, wherein the direction of the water jets runs at an angle under the steering propellers.

31. The high-speed naval surface vessel as claimed in claim 1, wherein the steering propellers are as close to one another such that the distance between them corresponds to 1.2 times the propeller diameter, and wherein a steering rudder blade is arranged at least one of in front of and behind the steering propellers, and is adapted to be used when moving straight ahead.

32. The high-speed naval surface vessel as claimed in claim 1, wherein the vessel includes a direct-current network with high-temperature superconducting current limiters.

33. The high-speed naval surface vessel as claimed in claim 1, wherein the electrical steering propellers, in the form of three-phase propulsion systems, are operated in the speed variation by field control range when the rotation speed exceeds $n_l$.

* * * * *